(12) United States Patent
Wald et al.

(10) Patent No.: US 12,304,611 B2
(45) Date of Patent: May 20, 2025

(54) VEHICLE BODY WITH CAVITY IN THE OUTER SKIN AND A CLOSING DOOR ARRANGEMENT

(71) Applicant: Airbus Defence and Space GmbH, Taufkirchen (DE)

(72) Inventors: Sascha Wald, Taufkirchen (DE); Michael Rappitsch, Taufkirchen (DE); Sebastian Peters, Taufkirchen (DE); Arne Bethge, Taufkirchen (DE); Rainer Sellhorst, Taufkirchen (DE); Ian Aspindle, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 18/384,484

(22) Filed: Oct. 27, 2023

(65) Prior Publication Data
US 2024/0140585 A1      May 2, 2024

(30) Foreign Application Priority Data
Oct. 28, 2022   (DE) .......................... 102022128630.4

(51) Int. Cl.
*B64C 1/14* (2006.01)
(52) U.S. Cl.
CPC ................................. *B64C 1/1407* (2013.01)
(58) Field of Classification Search
CPC ....... B64C 1/30; B64C 1/1407; B64C 1/1415; B64C 1/1423; B64C 1/1438; B64C 1/1446; B64C 25/10; B64C 25/18; B64C 2025/003; B64D 1/00; B64D 1/02; B64D 1/04; B64D 1/06; B64D 1/16

USPC ................................ 244/129.5, 137.3, 137.4
See application file for complete search history.

(56) References Cited

U.S. PATENT DOCUMENTS

| 2,670,156 | A | * | 2/1954 | Clark | ........................ | B64F 1/06 |
|---|---|---|---|---|---|---|
|  |  |  |  |  |  | 244/102 R |
| 2,731,221 | A |  | 1/1956 | Holton |  |  |
| 2,749,064 | A | * | 6/1956 | Kuhlman, Jr. | ........... | B64D 1/06 |
|  |  |  |  |  |  | 89/1.51 |
| 4,473,201 | A | * | 9/1984 | Barnes | ................. | B64C 1/1415 |
|  |  |  |  |  |  | 292/216 |

(Continued)

FOREIGN PATENT DOCUMENTS

DE      102007053554 A1    5/2009
EP         3421351 B1        4/2020

(Continued)

OTHER PUBLICATIONS

Extended European Search Report for EP Application No. 23199983.0, dated Mar. 15, 2024, 7 pages.

*Primary Examiner* — Joshua E Rodden
(74) *Attorney, Agent, or Firm* — KDW Firm PLLC

(57) ABSTRACT

A vehicle body with a cavity therein. The cavity is optionally closed or opened by a door arrangement with one or more door leaves. The door leaves are connected to a wall of the cavity via multiple-joint hinges. A pivot axis of the door leaves is situated outside the cavity, and the multiple-joint hinges are arranged completely in the cavity without taking up installation space outside the inner volume of the cavity when the door arrangement is in the closed state. This design requires little installation space and allows a great freedom of movement of the door leaves.

7 Claims, 6 Drawing Sheets

(56) References Cited

U.S. PATENT DOCUMENTS

| | | | | |
|---|---|---|---|---|
| 4,474,344 A * | 10/1984 | Bennett | B64D 33/02 137/15.1 |
| 5,803,405 A * | 9/1998 | Ellis | B64C 1/30 244/129.5 |
| 6,068,215 A * | 5/2000 | Gruensfelder | B64C 1/1415 244/129.5 |
| 6,098,925 A * | 8/2000 | Burdsall, II | B64D 1/06 244/130 |
| 6,206,326 B1 * | 3/2001 | Stanek | B64D 1/06 244/130 |
| 6,454,210 B1 | 9/2002 | Plattner | |
| 6,536,711 B1 * | 3/2003 | Conway, Jr. | B64C 3/48 244/129.5 |
| 6,739,554 B1 * | 5/2004 | Stanek | F15D 1/00 244/130 |
| 7,178,759 B2 * | 2/2007 | Rouyre | B64C 25/16 244/100 R |
| 7,243,880 B2 * | 7/2007 | White | B64C 25/16 244/129.4 |
| 8,286,916 B2 * | 10/2012 | Pauly | B64D 1/06 244/129.4 |
| 8,342,920 B2 * | 1/2013 | Tanner | B64D 13/02 454/71 |
| 9,096,311 B2 * | 8/2015 | Gleyze | B64C 25/001 |
| 9,180,967 B2 * | 11/2015 | Binkholder | F41F 3/065 |
| 10,099,769 B2 * | 10/2018 | Macaraeg, Jr. | B64C 1/1461 |
| 10,538,303 B2 * | 1/2020 | Kijak | E05C 17/02 |
| 10,829,969 B2 | 11/2020 | Rabois | |
| 10,871,348 B2 * | 12/2020 | Zätterqvist | B64D 1/02 |
| 12,037,832 B2 * | 7/2024 | Skilton | B64C 1/20 |
| 2006/0157621 A1 * | 7/2006 | Santos Rubio | B64D 1/06 244/129.4 |
| 2009/0314893 A1 * | 12/2009 | Lugaro | B64D 1/06 244/129.5 |
| 2016/0121996 A1 * | 5/2016 | Eveker | B64C 9/326 244/130 |
| 2018/0086463 A1 * | 3/2018 | Chattopadhyay | B64D 7/06 |
| 2018/0281963 A1 | 10/2018 | Dowty | |

FOREIGN PATENT DOCUMENTS

| | | |
|---|---|---|
| WO | 2014091294 A1 | 6/2014 |
| WO | 2021054879 A1 | 3/2021 |

\* cited by examiner

VEHICLE BODY WITH CAVITY IN THE OUTER SKIN AND A CLOSING DOOR ARRANGEMENT

TECHNICAL FIELD

The present description concerns a vehicle body for a vehicle, for example an aircraft with such a vehicle body. The vehicle body contains a cavity and a door arrangement closing the cavity.

BACKGROUND

The outer appearance of vehicles may be influenced by many peripheral conditions. For example, there are functional requirements which are imposed by the usage and application purpose of a vehicle.

In particular, the contour line of the vehicle may be conditional upon aerodynamic requirements. These specifications for the design of the outer appearance must in some cases be balanced against functional requirements. For example, it may be necessary for components to be arranged on the outside of the vehicle body, or for these components to be arranged such that they can be conveyed towards the outside. Either a component is mounted on the actual outside of the vehicle, or a component is mounted in a recess or cavity in the outer skin of the vehicle. This cavity may be covered during normal operation. In order to extract the component from the cavity, the corresponding orifice must be opened.

For example, a function component of an aircraft may be arranged in a recess in the outer skin. To ensure that this function component and the recess in the outer skin have little influence on the aerodynamic properties of the aircraft, the cavity is typically covered, for example by a hatch. If the function component must be extended or ejected during flight, the hatch must first be opened.

The cavity may for example be a storage space for components of the aircraft, for example parts of the running gear, retractable and extendable sensors, or a weapons bay. The cover of the cavity is a movable part which is separate from the remaining outer skin of the vehicle body. Because of the features associated with this design, the aerodynamic properties and radar signature of a vehicle body may be adversely affected. For example, gaps between the cover and the outer skin of the vehicle body lead to a deterioration in the radar signature.

SUMMARY

The object is therefore to provide a cover of a cavity in the outer skin of a vehicle body which has a simple structure and is designed such that the radar signature of the vehicle body is kept small in normal operation.

This object is achieved by the disclosure herein.

According to a first aspect, a vehicle body is provided which has an outer contour, a cavity arranged therein, and a door arrangement closing the cavity. The outer contour forms an outer contour of the vehicle body. The cavity is arranged in the vehicle body inside the outer contour. The door arrangement has a first door leaf. A multiple-joint hinge movably couples the first door leaf to a wall of the cavity. A drive is arranged to apply an action movement to the first door leaf. The door arrangement is arranged and configured to assume optionally a closed state in which the cavity is covered or an open state in which the cavity is open. The door arrangement is configured to form part of the outer contour of the vehicle body. The first door leaf is configured to be moved about a first pivot axis from the closed state to the open state and vice versa. The multiple-joint hinge has a first bearing and a second bearing. The first bearing is coupled to the wall of the cavity and the second bearing is coupled to the first door leaf. The multiple-joint hinge couples the first door leaf to the wall of the cavity such that the first pivot axis of a pivot process of the door leaf lies outside the cavity.

The cavity thus constitutes a recess or a void in the outer skin of the vehicle body, in which an inner volume is formed which can receive a component. The door arrangement covers the cavity and component arranged therein such that the door arrangement fills the recess formed by the cavity and, together with the other outer skin of the vehicle body, forms the desired outer contour.

The multiple-joint hinge is arranged in the cavity. A multiple-joint hinge has the advantage that it takes up little installation space and follows a predefined trajectory in its movement.

A multiple-joint hinge usually consists of multiple links or rods and contains multiple joints. The joints allow a relative rotational movement of the links connected together at a joint. Usually, two joints, each of which is rotatably coupled to at least one link, are arranged at a bearing point, e.g. a connection between the multiple-joint hinge and the wall of the cavity and/or the connection between the multiple-joint hinge and a door leaf. The multiple-joint hinge has further joints at which the links are pivotably connected together. These further joints change their position and/or orientation when the multiple-joint hinge executes a movement.

Because of this design, multiple-joint hinges allow a door leaf to be pivoted as if the pivot axis of the door leaf lay outside the position of the multiple-joint hinge as such. This again allows a specific movement of the door leaf to be implemented during the opening/closing. In particular, the door leaf can be pivoted such that, despite a narrow gap during opening (when the door leaf is moved from the closed state of the door arrangement to the open state of the door arrangement), it does not collide with the outer skin of the vehicle body or the periphery of the cavity.

The drive is also arranged on or in the cavity and coupled to the multiple-joint hinge or a door leaf. The drive can exert a force and/or movement on the multiple-joint hinge or door leaf, whereby the door leaf is moved from the closed state to the open state (or vice versa).

The drive is for example an electromechanical, pneumatic or hydraulic drive. For example, the drive is an electric motor.

A door leaf may be coupled to the wall of the cavity by a multiple-joint hinge or by several multiple-joint hinges. During operation of the vehicle with a vehicle body described herein, high forces may occur and act on the door arrangement. If several multiple-joint hinges are used to couple a door leaf to the wall of the cavity, the door leaf can be better held in a desired position even under high forces.

The cavity may for example (and without restriction) be a bay in an aircraft fuselage. This bay may contain tools, devices, equipment objects or weapons. By the use of multiple-joint hinges, the installation space required for these is kept small because multiple-joint hinges offer a comparatively high freedom of movement despite lower requirements for the size of the installation space. In particular, a multiple-joint hinge offers the possibility of placing the pivot axis differently from the position of the multiple-joint hinge, depending on how the joints are connected to the individual links and the number of joints. Also, a multiple-joint hinge as described herein allows the door leaf in the closed state to contribute to a low radar signature. This may be achieved for example in that a certain overlap gap of predefined shape and size is provided between the outer skin and the door leaves or between the overlapping door leaves. When multiple-joint hinges are used, such an overlap gap can advantageously be created and at the same time a high degree of mobility of the door leaves can be achieved with a small installation space for the multiple-joint hinges.

According to one embodiment, the door arrangement has a second door leaf. The second door leaf is configured to be moved about a second pivot axis out of the closed state into the open state and vice versa. The second door leaf is coupled to a wall of the cavity via a multiple-joint hinge. The second pivot axis is arranged outside the cavity.

The second door leaf, like the first door leaf, is coupled to a wall of the cavity. With respect to the connection between the second door leaf and the wall of the cavity, the same statements apply accordingly as for the connection between the first door leaf and the wall of the cavity. The second door leaf is coupled for example to a second wall by the associated multiple-joint hinge (or several multiple-joint hinges), whereas the first door leaf is coupled to a first wall by the associated multiple-joint hinge (or several multiple-joint hinges). The first wall and the second wall may be mutually opposing walls, between which an inner volume of the cavity is arranged.

The first door leaf and the second door leaf are usually moved jointly from the open state to the closed state, wherein it is conceivable that the opening or closing process provides that, during the movement process from a starting state (open/closed) into a target state (closed/open), one of the door leaves is moved before the other door leaf. Thus one of the door leaves usually reaches the target state first, and the second door leaf assumes the target state with a slight temporal delay. This sequence, in particular during the closing process, has the advantage that one door leaf can lie on the other door leaf when the door arrangement is brought into the closed state.

According to a further embodiment, when the door arrangement is in the closed state, the second door leaf overlaps the first door leaf in an overlap region.

Thus in the closed state of the door arrangement, the gaps of the cavity retain a desired, defined form. This may be advantageous in particular for military vehicles, since a radar signature is thereby reduced. This is achieved for example because radar waves enter the gap with defined form and can be absorbed along the gap. However, it may be required that a specific overlap length of adjacent elements, such as for example an outer skin and door leaves, or two overlapping door leaves, must be maintained. In such a scenario with predefined overlap lengths, the multiple-joint hinge allows collision-free movement of the overlapping components.

According to a further embodiment, the door arrangement has at least one holding element which is arranged in the overlap region. The holding element is configured to hold the second door leaf relative to the first door leaf reversibly in the closed state of the door arrangement.

In the closed state of the door arrangement, the holding element exerts a holding force in order for example to hold the second door leaf lying flat on the first door leaf. The holding element may for example be magnetic element, in particular an electromagnet. Multiple magnetic elements may be arranged both in or on the first door leaf and also in or on the second door leaf. When the door arrangement is in the closed state, the first door leaf and the second door leaf overlap in the overlap region in which at least one magnetic element is arranged. The magnetic elements arranged in the overlap region contribute to the door leaves maintaining a defined gap in the closed state. This gap for example allows movements of the gap-forming components along their surfaces, i.e. movements in the planar direction. Movements perpendicular to the surface of the components are however suppressed. For example, the magnetic elements are each arranged in the door leaves such that in the closed state, the magnetic elements lie opposite one another and exert a corresponding holding force. A force exerted by the drive on the multiple-joint hinge and the door leaves brings the door arrangement into the open state. During this movement, the electromagnets are not energized with electrical energy so that the holding elements do not hinder the movement. Alternatively, electric permanent magnets may be used as holding elements, wherein the electric permanent magnets exert a holding force in an unpowered state and do not exert a holding force when loaded with electrical energy. When the door arrangement is brought into the closed state, the holding elements again exert the predefined holding force.

This design may also reduce the risk of the two door leaves moving relative to one another during operation of the vehicle such that the gap in between assumes an undesired shape and/or size. Such a gap would be disadvantageous for the radar signature. The holding elements help reduce the risk of creation of a gap at the point.

According to a further embodiment, the drive is coupled to the multiple-joint hinge such that the drive applies a force and/or a movement onto the multiple-joint hinge, and that the first door leaf is moved from the closed state to the open state or vice versa.

The drive may be coupled directly to the multiple-joint hinge so that a force and/or a movement of the drive is transmitted to the multiple-joint hinge via an action element (e.g. a lever, linkage, gear mechanism or similar). The drive may for example be a linear drive or a rotational drive. The linear drive causes a linear movement of the action element, whereas the rotational drive causes a rotational movement of an action element. The drive may in particular be arranged such that it acts on a joint or a link of the multiple-joint hinge.

Each door leaf may be connected to the vehicle body, in particular a wall of the cavity, by one or more multiple-joint hinges. A separate drive may be assigned to each individual multiple-joint hinge. It is however also conceivable that a drive applies a force and/or a movement to several action elements, and each action element acts on a multiple-joint hinge in order to move the corresponding door leaf from the closed state to the open state or vice versa. Also, several drives may be functionally coupled to a single common action element, and this single common action element is in turn functionally coupled to several multiple-joint hinges. In this case, several drives act on the common action element, and this common action element drives several multiple-joint hinges.

According to a further embodiment, the first bearing and/or the second bearing is configured as a slide bearing.

With this design, deformations of the vehicle body may be absorbed or compensated such that deformations of the vehicle body do not act completely on the door leaves. Thus, a jam-free movement of the multiple-joint hinges is possible, since possible deformations of the door, cavity and/or body are not transmitted to the multiple-joint hinges. Lower mechanical stresses are introduced into the multiple-joint hinges. This may also contribute to the gap retaining a predefined shape and/or size, and the gap being distorted less when the door, cavity and/or body are deformed.

According to a further embodiment, the vehicle body comprises a locking element which is arranged on a multiple-joint hinge and is configured to lock the multiple-joint hinge in the closed state of the door arrangement.

With this design, the multiple-joint hinge is blocked in the closed state of the door arrangement, and it is not necessary for a drive to actively hold the multiple-joint hinge in the closed state. The locking element may for example be a hook which is brought into engagement with a movable element of the multiple-joint hinge, and thereby prevents the multiple-joint hinge from being able to transfer from the closed state to the open state. Before the multiple-joint hinge and the associated door leaf are set in the open state, it is necessary for the locking element to be released from the multiple-joint hinge. For this, a lock drive may be provided which is coupled to the locking element and is configured to move the locking element. The lock drive may for example be an electromechanical, pneumatic or hydraulic drive.

According to a further embodiment, the vehicle body furthermore comprises a spoiler, wherein the spoiler is coupled via a multiple-joint hinge to an end wall of the cavity and wherein the spoiler is configured to be moved about a third pivot axis from a retracted state into a deployed state, and vice versa. The third pivot axis is arranged outside the cavity.

The spoiler may for example be arranged on the cavity such that it is deployed when the door arrangement opens the cavity or shortly before this happens, i.e. when the door arrangement is moved from the closed state to the open state. In this case, the purpose of the spoiler is to positive influence an air flow at the predefined cavity in a desired fashion and reduce aero-acoustic loads. This design is particularly advantageous for openings or recesses in the outer skin of aircraft.

This same mechanism is used for opening (deploying) or closing (retracting) the spoiler as for the door leaves. The multiple-joint hinge has the advantage that a pivot axis of the spoiler may be arranged outside the cavity, so that the spoiler can be pivoted from the retracted state into the deployed state without the spoiler colliding with an outer skin of the body. The multiple-joint hinge allows the spoiler to be mounted in or on the opening of the cavity with a defined overlap gap, so that in a retracted state, there are very small gaps between the spoiler and outer skin of the vehicle body and/or between the spoiler and/or door leaves of the door arrangement, so that the radar signature is low.

According to a further embodiment, the third pivot axis runs transversely to the first pivot axis and to the second pivot axis.

In particular, the third pivot axis runs perpendicularly to the first and second pivot axes, wherein the first pivot axis runs usually parallel to the second pivot axis. For example, the first and second pivot axes extend in a longitudinal direction of the vehicle, and the third pivot axis runs transversely to the longitudinal direction of the vehicle.

According to a further aspect, an aircraft is provided which contains a vehicle body according to one of the above embodiments.

The vehicle body described herein is particularly suitable for use in an aircraft, furthermore in particular in a military aircraft. The structure using the multiple-joint hinges allows small gap sizes to be achieved between the door leaves and the outer skin of the aircraft. This is advantageous for the aerodynamic properties of the aircraft, and contributes to achieving a small radar signature, in particular since in the closed state of the door arrangement, the door leaves are distinguished by small gap sizes so that incoming radar signals (i.e. electromagnetic waves in a spectral region used specifically by radar devices) are reflected in a manner necessary for analysis to the smallest possible extent.

In a closed state of the door arrangement, the door leaves partially overlap and lie closely against the outer skin of the vehicle body along a periphery of the cavity in the vehicle body. In other words, the cavity is tightly closed by the door arrangement as completely and gaplessly as possible. Thus, no additional covers are required in the hinge region, which simplifies the structure of the aircraft.

Although the vehicle body and mechanism used for opening and closing the door arrangement have been described in the present case with reference to an aircraft, the use of the vehicle body is not restricted to this. A door arrangement as described herein may be used in connection with a cavity in the outer skin of a terrestrial vehicle, a watercraft, an underwater vehicle or spacecraft.

BRIEF DESCRIPTION OF THE DRAWINGS

Some details are described in more depth below with reference to the appended drawings. The illustrations are schematic and not to scale. The same reference signs relate to the same or similar elements. In the drawings.

DETAILED DESCRIPTION

Figure 1:
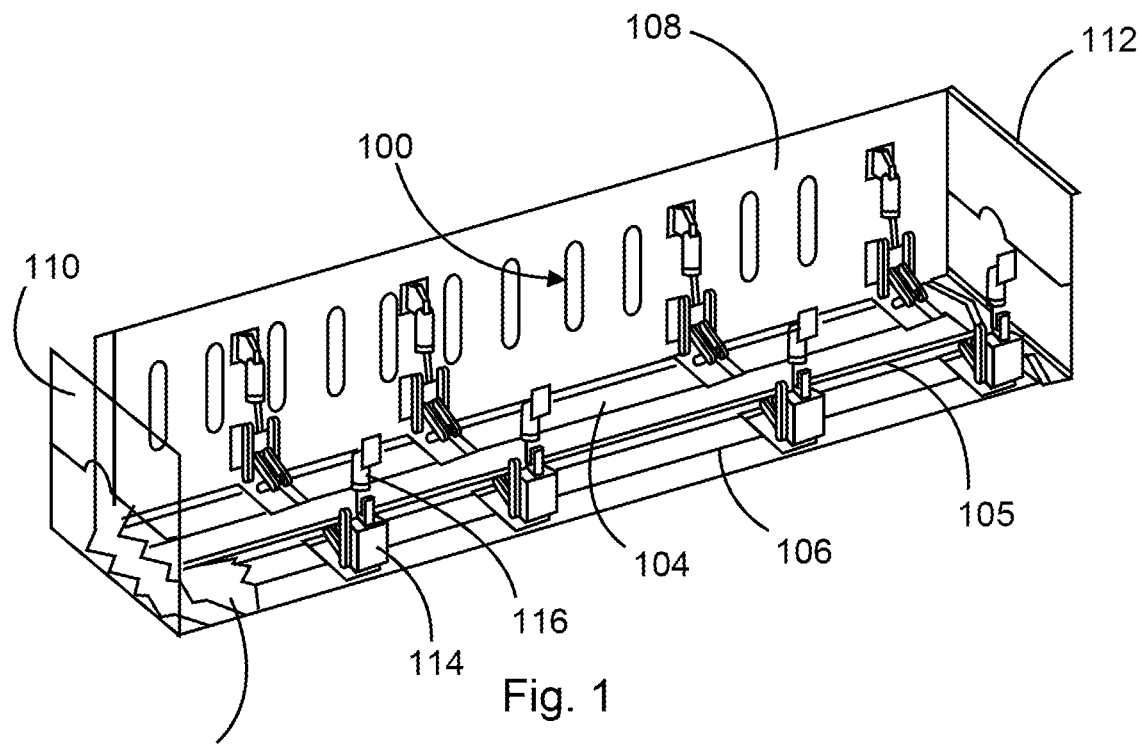
FIG. 1 shows a schematic illustration of a cavity in a vehicle body with a door arrangement.

FIG. 1 shows a cavity 100 which is arranged in an outer skin or surface of a vehicle body, wherein in the illustration of FIG. 1, a graphic depiction of the surrounding parts of the vehicle body has been omitted. For a corresponding depiction, reference is made to FIG. 9.

In each case, the cavity 100 forms an inner volume which is typically surrounded by multiple walls. In the example of FIG. 1, three walls 108, 110, 112 are shown, wherein the wall facing the viewer is not illustrated. The wall 108 is designated the first wall and extends in the longitudinal direction of the cavity. The longitudinal direction of the cavity typically also coincides with the longitudinal direction of the vehicle body. The second wall 110 and the third wall 112 are arranged on the end faces of the cavity.

The cavity 100 may for example be a weapons bay or another bay for a device on a vehicle. In military vehicles, the installation space for equipment is often tight. An installation space for the inner volume of the cavity is thus achieved at the cost of other components. The greater the inner volume of the cavity 100, the less installation space is available for other components. To this extent, it is desirable to keep the installation space for the cavity 100 and the elements connected thereto (in particular for the hinges and the door arrangement) as small as possible.

To achieve this target, according to the proposal described herein, the door leaves 104, 106 are coupled via multiple-joint hinges 114 to an inner wall of the cavity, in the present case the first wall 108 and the wall (not shown here) opposite the first wall 108. The multiple-joint hinges 114 are completely arranged inside the inner volume of the cavity 100 and require no installation space which extends beyond the walls of the cavity outside the inner volume when the door arrangement is in the closed state. No installation space is required for the multiple-joint hinges 114 outside the volume of the cavity 100, nor is there a need for any space protruding into the walls 108, 110, 112 of the cavity 100 when executing the movement of the multiple-joint hinges 114. Thus, the installation space in the vehicle body surrounding the cavity can be used completely for other components, and no additional installation space need be reserved inside the vehicle body for the multiple-joint hinges and their movement.

In the example of FIG. 1, both the first door leaves 104 and the second door leaf 106 are each coupled to a wall of the cavity 100 by four multiple-joint hinges 114. In the example shown here too, a drive 116 is assigned to each multiple-joint hinge 114. In the present case, the drive 116 is a linear drive. The linear drive acts on the corresponding multiple-joint hinge and moves the corresponding door leaf out of the closed state into the open state and vice versa.

On the second wall 110, which may also be called the front end face, a spoiler 140 is arranged which is also moved by multiple-joint hinges. The spoiler 140 and the assigned multiple-joint hinges and drives are described in more detail below with reference to FIG. 7.

In a middle region of the cavity 100, the first door leaf 104 and the second door leaf 106 overlap in an overlap region 105. The first door leaf 104 and the second door leaf 106 thus do not form a butt joint with one another, but overlap one another in order to form a gap of predefined shape and/or size at this point. The gap is in particular formed such that it is an overlap gap in which radar waves can enter. An absorbing material may be arranged at the overlapping components to attenuate or at least partially absorb the radar waves. This may help reduce the radar signature of the vehicle body and in particular the door arrangement. Because the first door leaf and second door leaf overlap one another, the gap of defined shape and/or size exists in this middle region.

Figure 2:
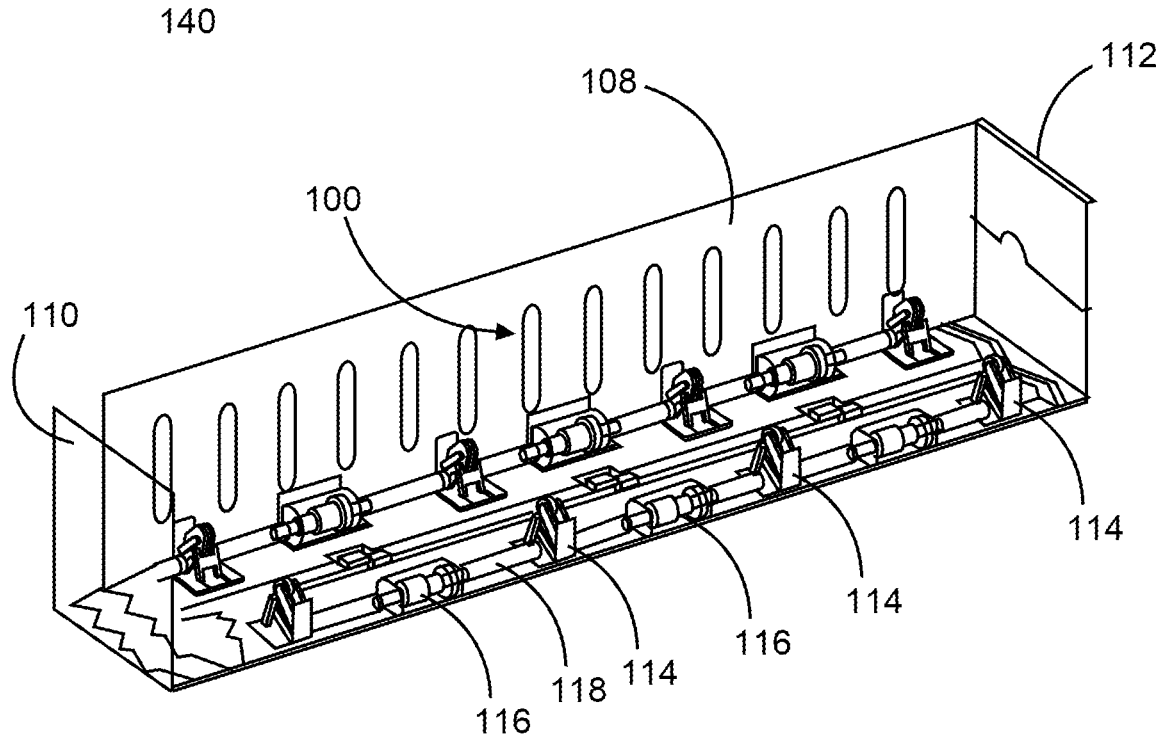
FIG. 2 shows a schematic illustration of a cavity in a vehicle body with a door arrangement.

FIG. 2 shows a similar structure of a cavity 100 as in FIG. 1, wherein in the example of FIG. 2, a rotational drive is used to drive the multiple-joint hinges 114. In the example shown, multiple drives 116 are arranged along a drive shaft 118. The drive shaft 118 extends in the longitudinal direction of the cavity and is coupled to every multiple-joint hinge 114. The drives 116 turn the drive shaft 118, whereby the multiple-joint hinges 114 cause a corresponding movement of the first door leaf and the second door leaf.

Otherwise, the example of FIG. 2 is structured identically to the example from FIG. 1.

Figure 3:
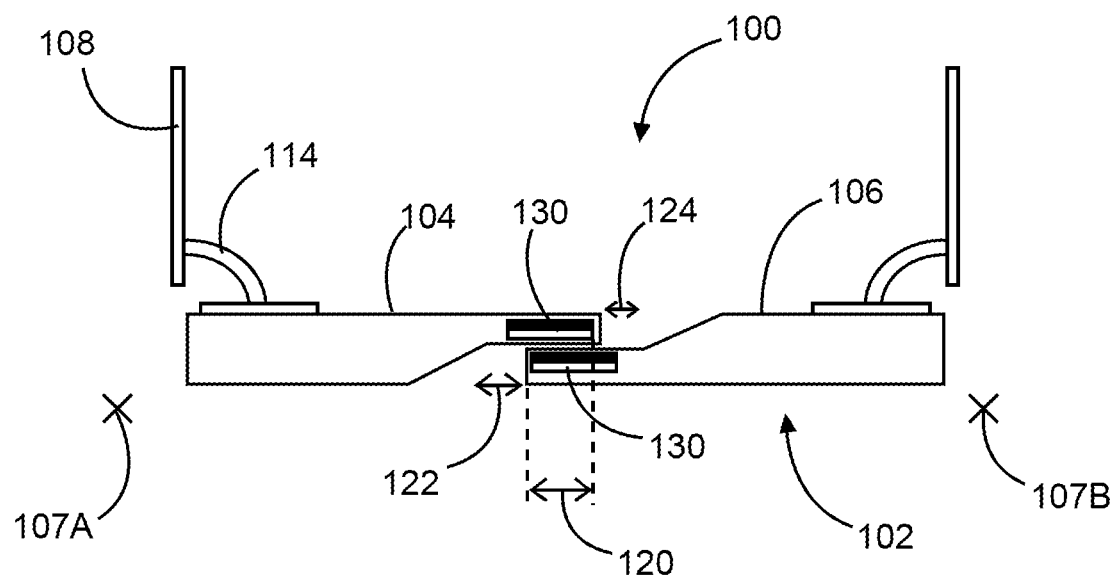
FIG. 3 shows a schematic illustration of the cross-section of a cavity in a vehicle body with a door arrangement.

FIG. 3 shows a cross-sectional illustration of a cavity 100 with the side wall 108 and the opposite side wall, wherein a door leaf 104, 106 is pivotably mounted on each side wall via one or more multiple-joint hinges 114. The first door leaf 104 is mounted movably such that the pivot movement of the door leaf 104, on movement from the closed state to the open state, takes place about the first pivot axis 107A. This pivot axis 107A lies outside the cavity 100. This cross-sectional illustration also shows that the multiple-joint hinges 114 are arranged completely inside the cavity 100 and do not protrude into the walls shown, whereby no installation space is required outside the inner volume of the cavity 100. The second door leaf 106 is mounted opposite the first door leaf 104 such that, on a movement from the closed state into the open state, the pivot movement of the door leaf 106 takes place about the second pivot axis 107B. The second pivot axis 107B also lies outside the cavity 100.

FIG. 3 furthermore shows that the first door leaf 104 and second door leaf 106 overlap in an overlap region 120. Thus, for example radar signals cannot penetrate into the interior of the cavity through a gap between the door leaves. The overlap region 120 of the two door leaves is dimensioned such that a degree of lateral movement 122, 124 of the door leaves can be permitted in the closed state while an overlap of the door leaves is still retained. If for example the door leaves 104, 106 execute the lateral movements 122, 124 under loading of the vehicle body, access to the inner volume of the cavity 100 remains closed. Because a lateral movement 122 is permitted, lower stresses are induced in the multiple-joint hinges and/or door leaves. Despite the lateral movement 122, the door leaves overlap one another in the overlap region and form a gap of specific, predefined shape and/or size so that radar waves are absorbed.

In the overlap region 120, the first door leaves 104 and the second door leaf 106 have holding elements 130. In the example shown, each door leaf has a holding element 130, wherein each door leaf may also have multiple holding elements 130. The holding elements 130 may for example be magnetic elements which are designed to hold the first door leaf 104 relative to the second door leaf 106 in the closed state of the door arrangement 120.

Figure 4:
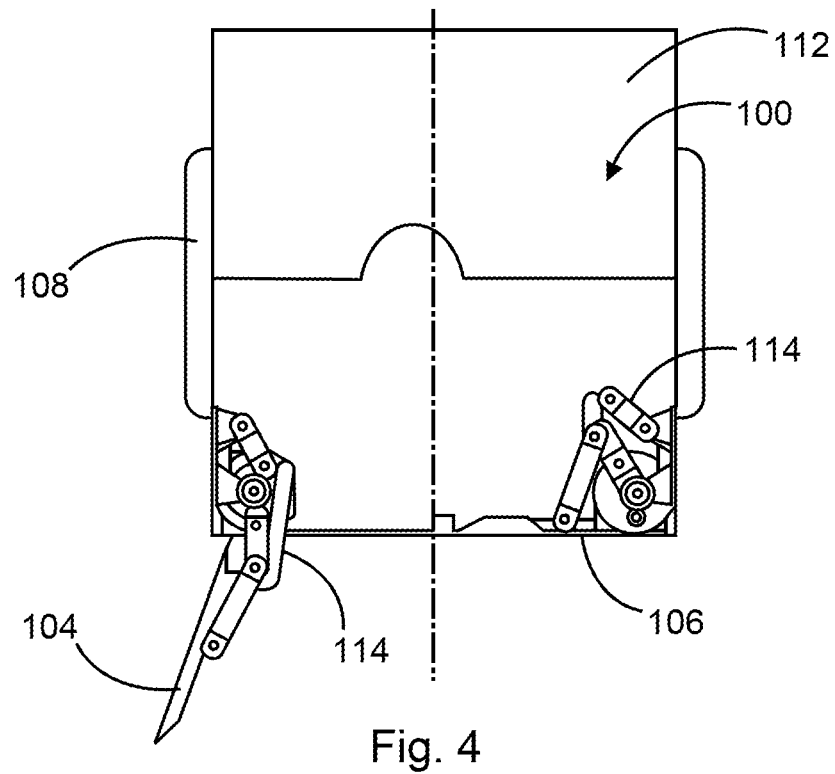
FIG. 4 shows a schematic illustration of the cross-section of a cavity in a vehicle body with a door arrangement.

FIG. 4 shows an illustration of a cavity 100 from a similar perspective to FIG. 3. The third wall 112 can be seen in the background of the drawing. A wall terminates the inner volume of the cavity on the left and right sides. The first door leaf 104 is shown in the open state and the second door leaf 106 is shown in the closed state.

Depending on which door leaf overlaps the other door leaf on the outside, viewed from the inner volume of the cavity, the corresponding door leaf is opened first in order to clear the movement path for the other door leaf. In the example of FIG. 3, the second door leaf 106 is arranged on the outside in the overlap region 120, whereby the second door leaf 106 would be the first to be opened.

Figure 5:
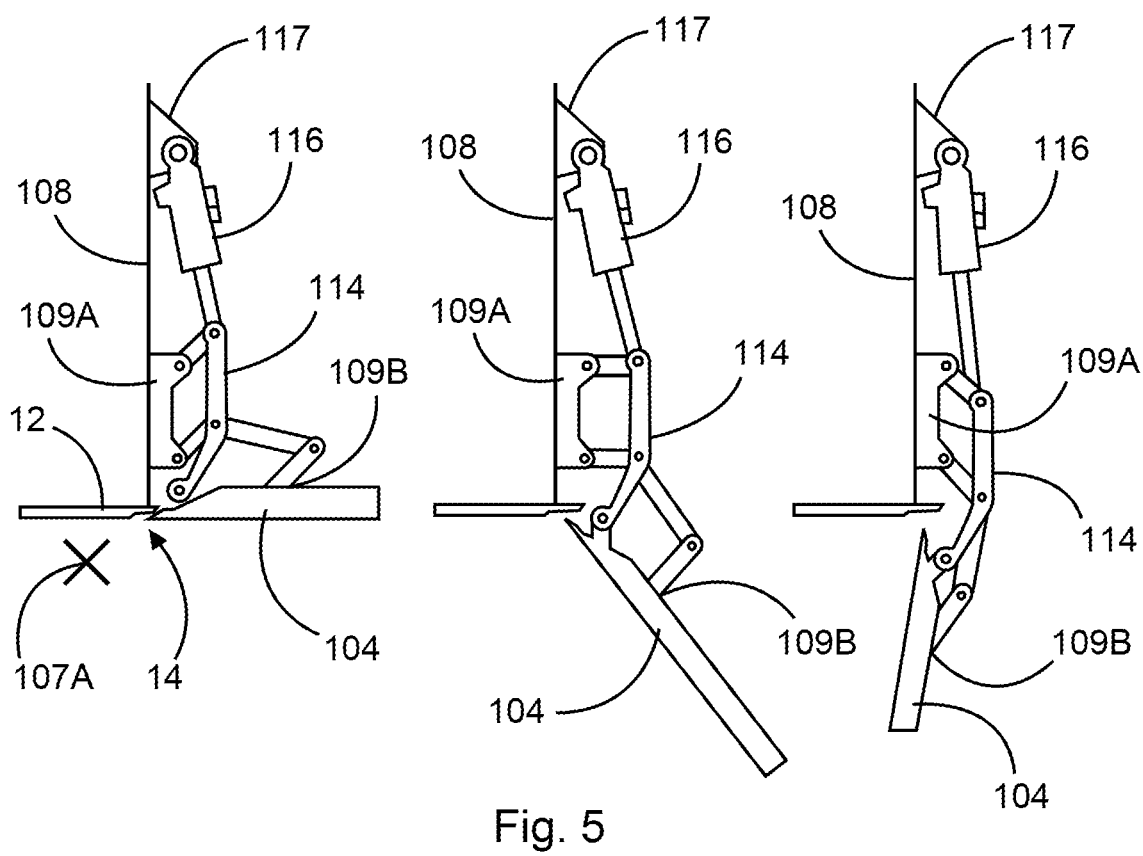
FIG. 5 shows a schematic illustration of a door arrangement with a door leaf in various positions.

FIG. 5 shows an illustration of the first door leaf 104 in three different positions. Starting on the left side, the first door leaf 104 is in the closed position. The multiple-joint hinge 114 is attached to the first wall 108 by a first bearing 109A and to the first door leaf 104 by a second bearing 109B. The drive 116 is attached to the first wall 108 by a suspension 117 and is arranged so that it can exert a force and/or a movement on the multiple-joint hinge 114. In the closed position, the first door leaf 104 also overlaps a part of the surrounding edge of the cavity or the outer wall 12 of the vehicle body. This transitional region is here marked with reference sign 14. In addition to the overlap region 120 described in FIG. 3, there is an overlap region or transitional region 14 between the first door leaf 104 (and second door leaf 106) and the outer wall 12 of the vehicle body, so as to prevent the formation, in the closed position of the door leaf, of a gap which could adversely affect the radar signature of the vehicle body.

With reference now to the middle illustration in FIG. 5, the drive 116 has exerted a force on the multiple-joint hinge and indirectly on the first door leaf 104, so that the first door leaf 104 is in a partially open position. During this movement, the first door leaf 104 executes a pivot movement about the first pivot axis 107A. Because the pivot axis 107A is arranged outside the cavity, the first leaf does not collide with the outer wall 12 during this pivot movement.

With further reference to the illustration in FIG. 5, the depiction on the far right shows the door leaf 104 in the fully open position. The fully open position is defined as that in which the door leaf 104 is outside a movement region of any elements which are extended or ejected from the cavity.

Figure 6:
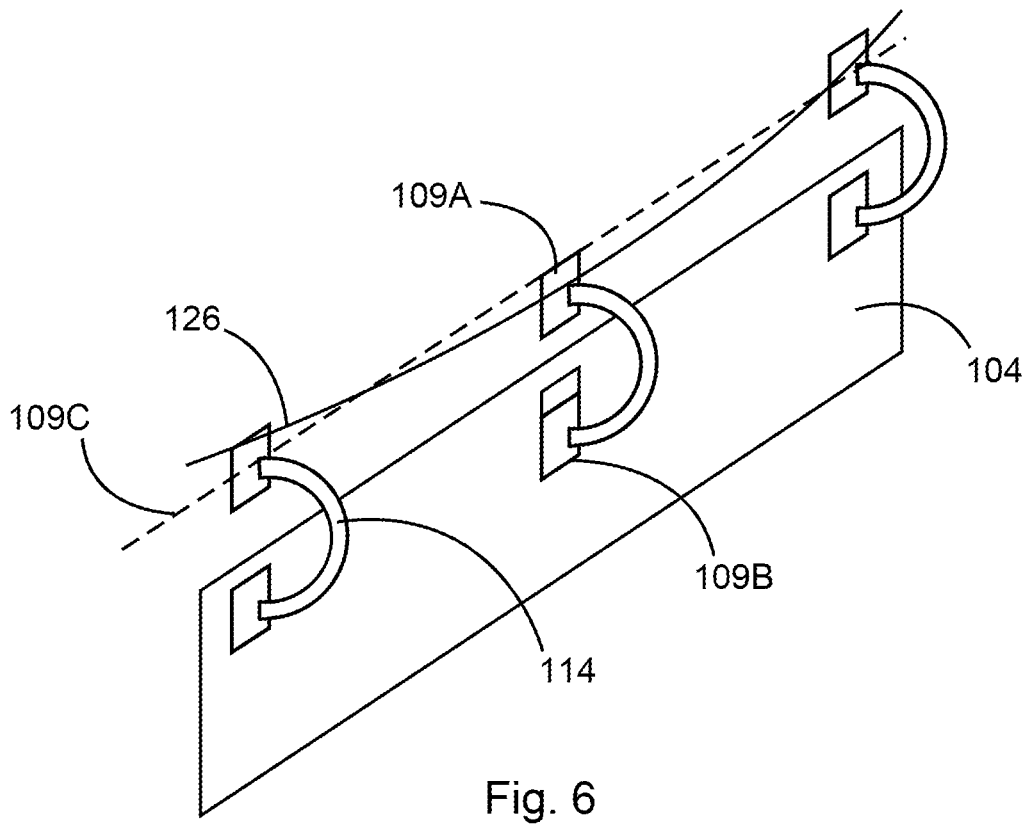
FIG. 6 shows a schematic illustration of a door leaf and the associated hinge.

FIG. 6 shows a door leaf 104 which is held by three multiple-joint hinges 114. This illustration does not show the wall of the cavity. In any case, each multiple-joint hinge 114 has a first bearing 109A and a second bearing 109B, wherein the first bearing 109A is coupled to a wall of the cavity and the second bearing 109B is coupled to the first door leaf 104. The plurality of first bearings 109A of the multiple-joint hinges 114 are arranged, in an unloaded starting state, such that they are situated along a predefined bearing axis 109C. If a load is exerted on the vehicle body, it may occur that the second bearings 109B are shifted relative to one another. This may allow a movement or mechanical stress to be exerted on the first door leaf 104. To reduce this effect, the first bearing 109A and/or the second bearing 109B may be configured as slide bearings. This means that the first bearing 109A can move in at least one direction relative to the wall to which is attached, by sliding along the plane of the wall, and the second bearing 109B can move in at least one direction relative to the first door leaf 104 to which it is attached, by sliding along the plane of the first door leaf. For example, the first bearing and/or the second bearing may be mounted on a rail which allows a linear movement along the rail.

Figure 7:
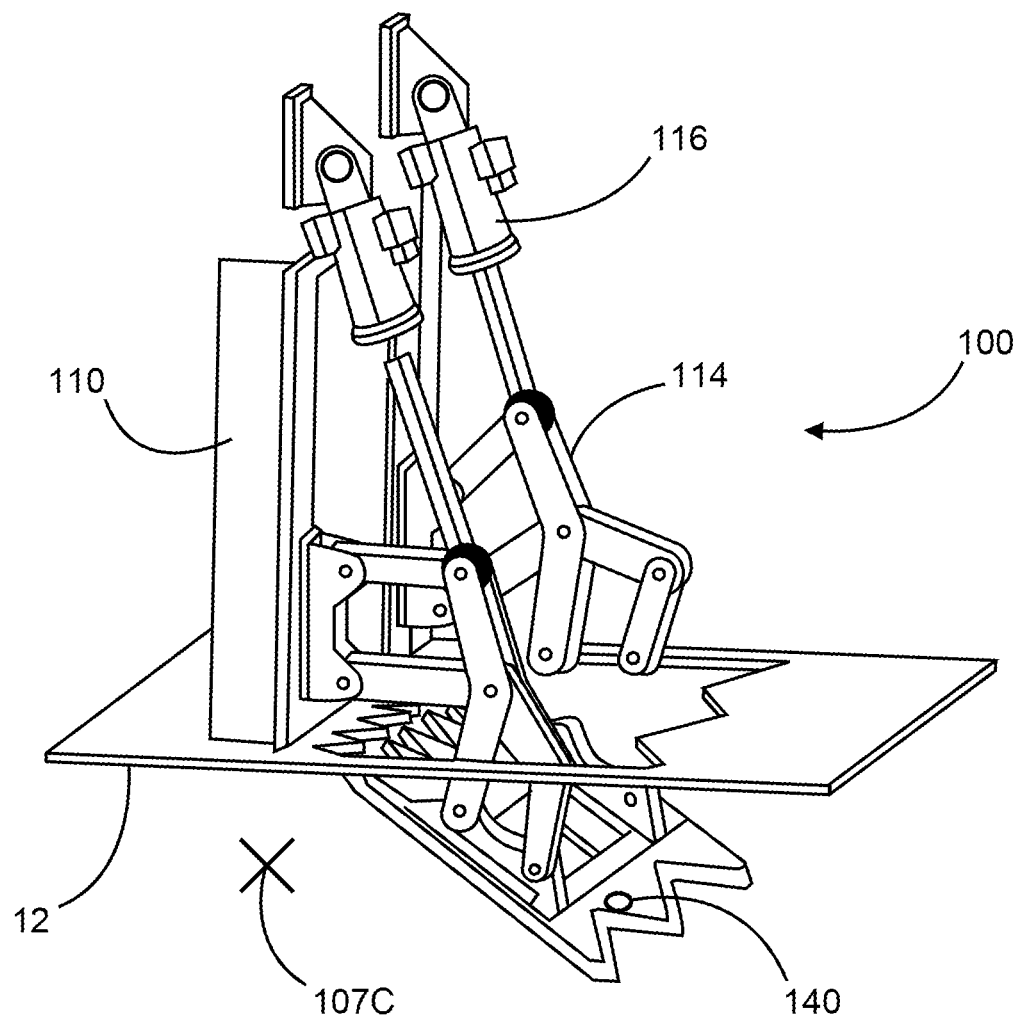
FIG. 7 shows a schematic illustration of a spoiler for a cavity in a vehicle body.

FIG. 7 shows an illustration of a region of the cavity 100 on the second wall 110. A spoiler 140 is arranged to be moved about the third pivot axis 107C from a closed position to an open position as shown in FIG. 7. The drive 116 exerts a force and/or movement on the multiple-joint hinge 114 in order to pivot the spoiler 140 about the third pivot axis 107C. As with the door leaves 104, 106, the second pivot axis 107C of the spoiler 140 is also situated outside the cavity 100. The second wall 110 is usually on the front end of the cavity 100 in the movement direction of the vehicle. Like the door leaves 104, 106, the spoiler 140 may also overlap a part of the outer wall 12 of the vehicle body 10. For example, along its complete periphery, the spoiler forms an overlap region with the outer surface of the body and the door leaves 104, 106. At its rear end, the spoiler 140 may have a zig-zag or angular edge contour, as shown in FIG. 7. The edges are in particular parallel to other edges of the aircraft, such as for example wing leading edges or wing trailing edges, in order to further reduce the radar signature.

Figure 8:
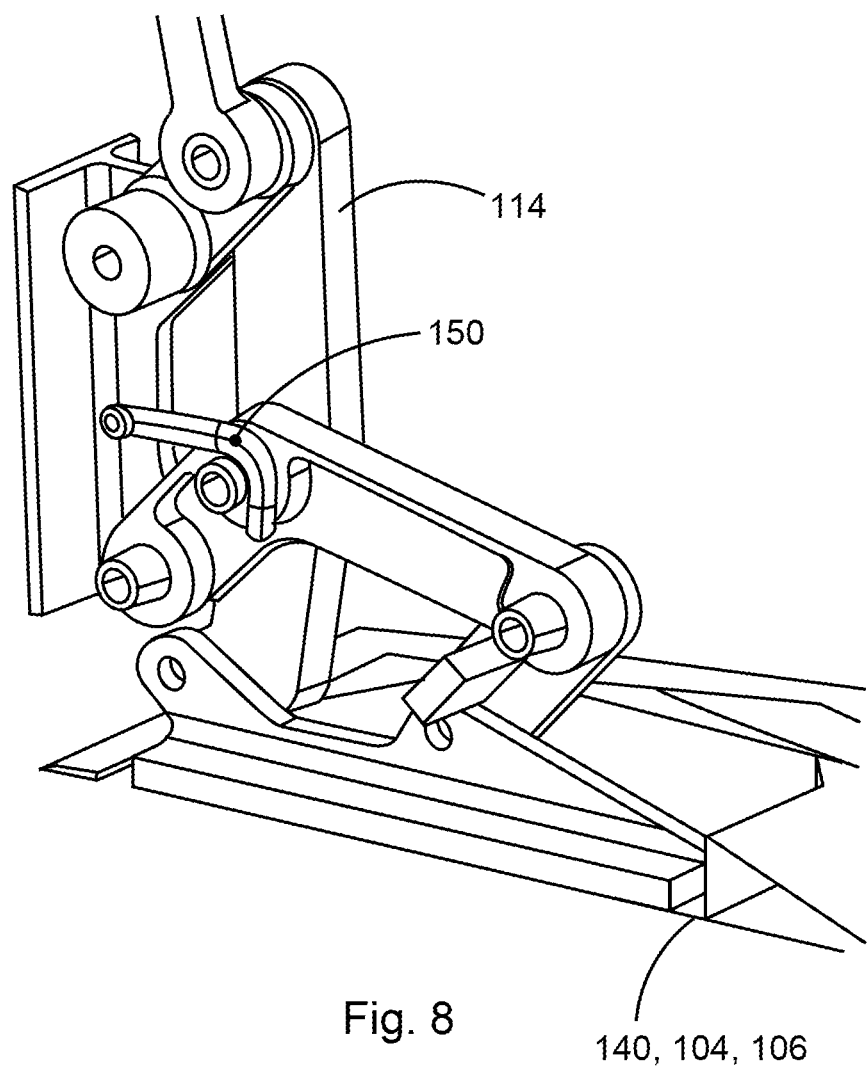
FIG. 8 shows a schematic illustration of a multiple-joint hinge with a locking element.

FIG. 8 shows a detailed illustration of a multiple-joint hinge 114 with a locking element 150. The locking element 150 in this example is configured as a hook which can be brought into engagement with a joint of the multiple-joint hinge 140 in order to hold this joint in the corresponding position, whereby the multiple-joint hinge 114 as a whole can no longer move and a door leaf 104, 106 or spoiler 140 coupled to the multiple-joint hinge is also held in the corresponding position. The corresponding holding force is exerted by the locking element 150 and need not be actively introduced into the system via the drive.

In particular in the case of very long door leaves, it may be advantageous to arrange several multiple-joint hinges along the door leaves, and lock some or all multiple-joint hinges with a respective dedicated locking element 50. Thus, the holding force is applied to the door leaf at several points and an undesired partial opening during operation of the vehicle is suppressed.

The locking element 150 may be driven by a locking drive (not shown). The locking drive may for example be configured as an electromechanical, hydraulic or pneumatic drive element, and the locking element can move, in particular pivot, from an unlocked into a locked state (and vice versa).

Figure 9:
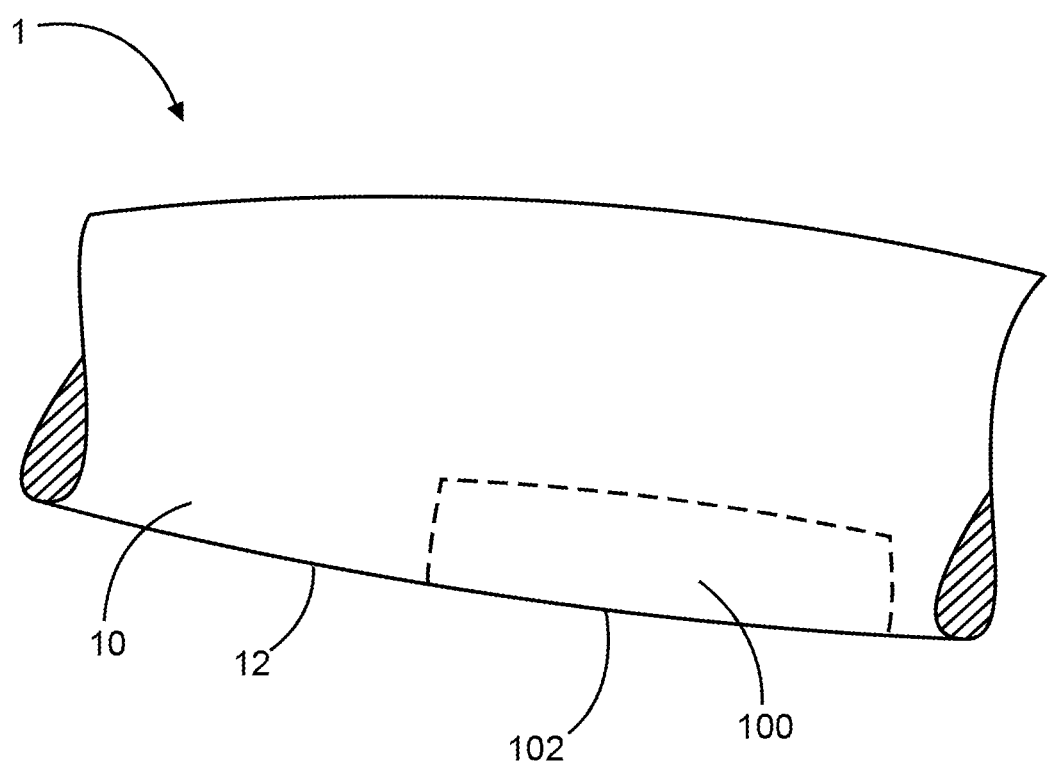
FIG. 9 shows a schematic illustration of a vehicle body which is used in an aircraft.

FIG. 9 shows a vehicle body 10 of an aircraft 1. The vehicle body has an outer contour or outer wall 12. Inside the outer contour, a cavity 100 is provided which is closed and can be opened by a door arrangement 102. For example, extendable components or weapons may be arranged in the cavity 100.

The cavity 100 is a cavity as described with respect to the previous figures. Multiple-joint hinges and drives as shown and described above are arranged in the cavity.

In addition, it is pointed out that the terms "comprising" or "having" do not exclude other elements or steps, and "one" or "a" does not exclude a plurality. It is furthermore pointed out that features or steps which have been described with reference to one of the above exemplary embodiments may also be used in combination with other features or steps from other exemplary embodiments described above. Reference signs in the claims should not be regarded as a restriction.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE

1 Aircraft
10 Vehicle body
12 Outer contour, outer wall
14 Transitional region
100 Cutout, recess, cavity
102 Door arrangement
104 First door leaf
105 Closing region, overlap region
106 Second door leaf
107A First pivot axis of the door leaf
107B Second pivot axis
107C Third pivot axis
108 First wall
109A First bearing
109B Second bearing
109C Bearing axis
110 Second wall
112 Third wall
114 Multiple-joint hinge
116 Drive (linear drive, rotational drive)
117 Suspension 118 Drive shaft
120 Overlap region
122 Lateral movement
124 Lateral movement
126 Body deformation
130 Holding element
140 Spoiler
150 Locking element

The invention claimed is:

1. A vehicle body comprising:
an outer contour which forms an outer contour of the vehicle body;
a cavity in the vehicle body, inside the outer contour;
a door arrangement that has a first door leaf and a second door leaf, forms part of the outer contour of the vehicle body, and is configured to assume optionally a closed state, in which the cavity is covered, or an open state, in which the cavity is open;
a first multiple-joint hinge which has a first bearing, which is coupled to a wall of the cavity, and a second bearing, which is coupled to the first door leaf, wherein the first multiple-joint hinge movably couples the first door leaf to the wall of the cavity;
a drive configured to move the first door leaf; and
a spoiler that overlaps a part of an outer wall of the vehicle body, is coupled to an end wall of the cavity via a second multiple-joint hinge, and forms an overlap region with an outer surface of the vehicle body, the first door leaf, and the second door leaf along an entirety of a periphery of the spoiler;
wherein the first door leaf is movable about a first pivot axis from the closed state into the open state and from the open state into the closed state;
wherein the second door leaf is movable about a second pivot axis out of the closed state into the open state and out of the open state into the closed state;
wherein the second door leaf is coupled to another wall of the cavity via a third multiple-joint hinge;
wherein, in the closed state of the door arrangement, the second door leaf overlaps the first door leaf in an overlap region;
wherein the spoiler is movable about a third pivot axis from a retracted state into a deployed state and from the deployed state into the retracted state;
wherein the first pivot axis, the second pivot axis, and the third pivot axis are each outside the cavity;
wherein the end wall of the cavity to which the spoiler is coupled is inside the cavity; and
wherein the second multiple-joint hinge is attached to a face of the end wall of the cavity.

2. The vehicle body of claim 1, wherein:
the door arrangement has at least one holding element, which is in the overlap region; and
the holding element is configured to hold the second door leaf relative to the first door leaf reversibly in the closed state of the door arrangement.

3. The vehicle body of claim 1, wherein the drive is coupled to the first multiple-joint hinge to apply a force to and/or to move the first multiple-joint hinge, such that the first door leaf is moved from the closed state into the open state or from the open state into the closed state.

4. The vehicle body of claim 1, wherein the first bearing and/or the second bearing is configured as a slide bearing.

5. The vehicle body of claim 1, comprising a locking element which is arranged on a fourth multiple-joint hinge and is configured to lock the first multiple-joint hinge in the closed state of the door arrangement.

6. The vehicle body of claim 1, wherein the third pivot axis runs transversely to both the first pivot axis and the second pivot axis.

7. An aircraft, comprising a vehicle body of claim 1.

* * * * *